3,056,339
APPARATUS FOR THE CONTINUOUS PRODUCTION OF PACKAGING

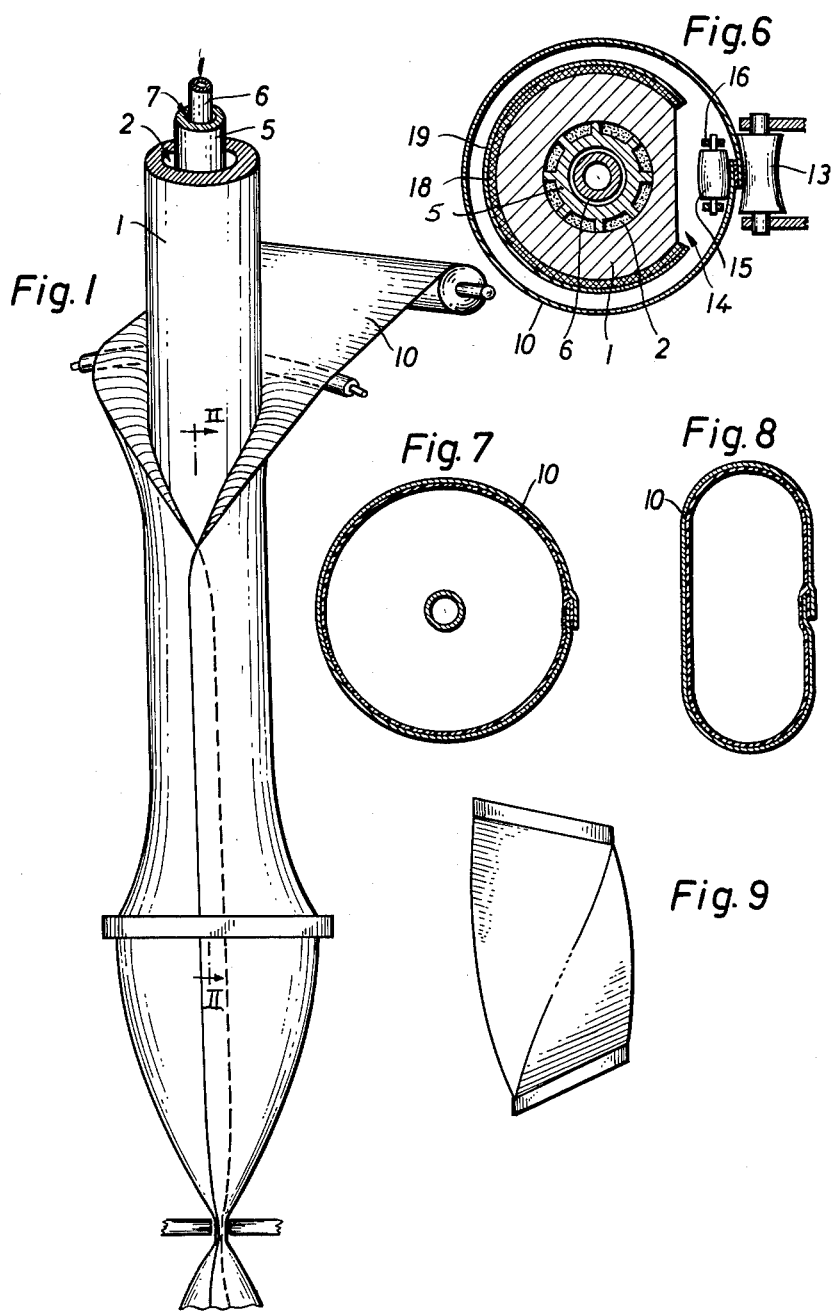

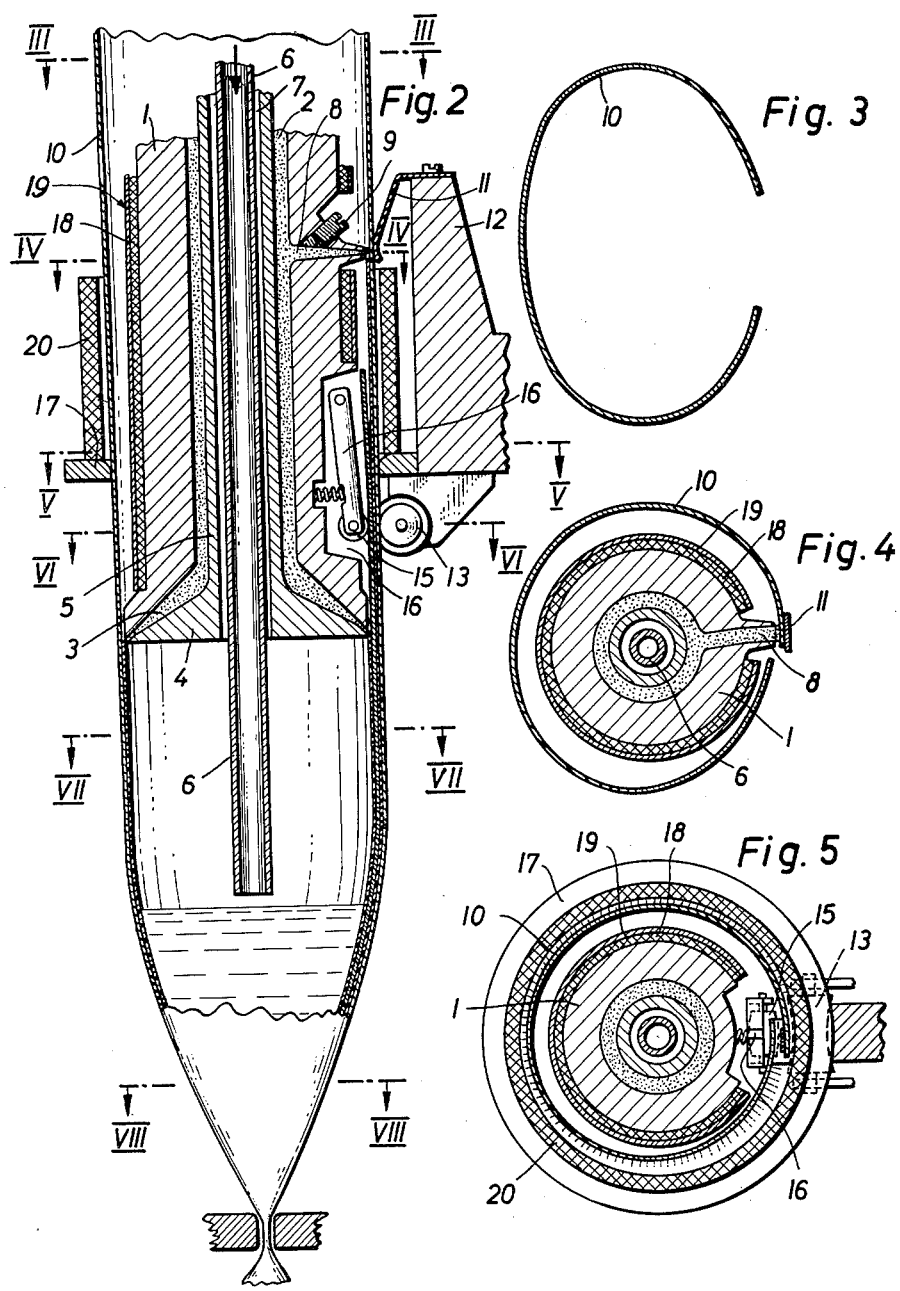

Franz Sommerfeld, Wahn, near Cologne, and Justus Luther, Munich, Germany, assignors to Reifenhauser K.G., Troisdorf-Cologne, Germany
Filed Jan. 4, 1960, Ser. No. 351
11 Claims. (Cl. 93—82)

The present invention is concerned generally with an apparatus for the continuous production of packaging; and more particularly of tubing formed of paper, cardboard, synthetic plastic or the like, and having the inside coated with a thermoplastic synthetic plastic, and which is adapted to use in containers for fluid, powdery or granular materials, especially foodstuffs.

Specifically the present invention is concerned with improvements in a known apparatus for producing packaging of the type described, such an apparatus for example as are described in the copending Reifenhäuser application S.N. 768,239. In the known apparatus, at a location where a thermoplastic synthetic plastic substance is being extruded into a continuous thin-walled tube, paper or other material in a continuous band or strip form is transversely wrapped or bent to bring opposite edges into overlapped relation with a thread of thermoplastic material laid between and serving to cement the overlapped edges when heated and pressed together, thereby continuously producing a cylinder surrounding the continuously extruded tubing, to which the tubing is applied as an interior sealing coating.

The said known apparatus for carrying out the aforedescribed prior process, includes an extrusion head of a thermoplastic extrusion machine, the head having an annular or ring-like nozzle, from which the thermoplastic tubing issues; and also includes special means in the region of the annular nozzle for guiding the strip stock which is formed into the cylinder. Moreover, behind the ring nozzle, the extrusion head is provided with a small lateral nozzle structure projecting radially to the direction of the tubing extrusion, and having its end portion, in which the actual nozzle opening occurs, inserted between the overlapped edges of the strip stock, so that a thread of the thermoplastic material is also extruded between the overlapped edges as a bonding adhesive therefor. Between the lateral and ring nozzles there are means for applying pressure and heat to the overlapped edges, such as opposed inside and outside rolls whereby the longitudinal seam of the cylindrical body being formed is completed before reaching the ring nozzle where the interior coating is extruded and applied. Through an axial passageway opening at the center of the ring nozzle structure end face, the goods to be packaged may be introduced to the container as it is formed.

The present invention improves the prior apparatus first by applying the thermoplastic substance which is to cement the overlapped strip stock edges directly to one of the edges in a thin narrow stripe, say on the order of 0.05 mm. in thickness and 8 mm. wide, thus advantageously controlling the amount and locus of application of the adhesive in comparison with prior practice; and secondly by maintaining the space enclosed by the coated cylinder under a gas pressure.

The present invention modifies the prior practice, by use of a lateral nozzle for bleeding off some of the thermoplastic extrusion mass in the extrusion head as the edge cementing adhesive material to a radial nozzle end opening; and by providing means for guiding the inner side of one margin of the strip across the end of the nozzle, the strip being held against the nozzle by elastic pressure, whereby the adhesive material is applied thereto as a stripe of width determined by the nozzle form. An adjusting screw threaded into a wall of the lateral nozzle structure varies the nozzle feed channel area to regulate the flow of the adhesive. External of the extrusion head itself, say on some part of the extruder frame, a small spring finger is mounted opposite the lateral nozzle to hold the margin of the partially bowed or shaped strip in contact therewith.

A guide ring element, coaxial with the generally cylindrical extrusion head for sizing the strip to final shape and likewise supported by some part of the environment external to the head, is located between the lateral nozzle and the main ring nozzle at the end of the head. Then between the guide ring element and the ring nozzle there are disposed an opposed pair of pressure rollers, an inner roller in an extrusion head recess and an outer roller again mounted on the external environment, which press the coated and uncoated margins of the sheet together into final bonded relation.

To keep the coated margins from premature contact, that is, contact before the strip stack is shaped into final form, between the pressure rolls and the lateral nozzle a device is provided in the region of the guide ring to hold one margin away from the other.

For preheating of the paper strip bent or shaped about the extrusion head, and as well for heating of the extrusion head feed channel, an electrical heating jacket with guard cover is provided on the head. For further heating of the shaped paper stock to the temperature necessary for the coating of its inner surface with the synthetic plastic tube extruded from the main or ring nozzle, an electric radiant heater surrounds the paper tube in the region between the guide ring and lateral nozzle. The latter heater operated at a temperature of about 300°–350°, has the further function of bringing the adhesive stripe applied to one of the paper margins to the temperature required to obtain a permanent bonding of the longitudinal seam upon passing under the pressure rollers.

Whereas in the prior apparatus the extrusion head had merely a central filling channel for feeding the goods to be packed, and coaxial therewith a nozzle feed channel of annular cross section for the thermoplastic material extruded at the ring nozzle, the present invention further proposes another annular channel or passage located between the two channels first mentioned, which supplies an inert gas to the interior space of the container being fabricated. This gas supply channel further serves to insulate the container filling tube, hence the material therein which is to be packaged from the heat of the surrounding extrusion nozzle feed channel. It has now been found possible to simplify structural elements involved in prior apparatus, where inert gas is thus supplied to the container, particularly forming devices in the region of the ring nozzle, such as a guide ring and a piston-like mandrel enlargement, which may be now obviated.

The extrusion nozzle feed channel is formed by a nozzle tube extending coaxially through a central bore of the extrusion head body, the end of the bore widening out in funnel-like manner, and the nozzle tube likewise expanding into a relatively shallow conical enlargement to define therebetween the ring nozzle opening, the enlargement being substantially flush with the ring nozzle opening. This nozzle tube may be maintained in proper position relative to the extrusion head body by a centering ring means, axially perforated or channeled for passage of the extrusion material; the centering ring, insofar as it diminishes the cross-section of the feed channel, also serving as a dam ring for the extrudible material.

An object of the invention is then to provide an improved apparatus for continuously forming an interiorly coated and sealed cylindrical tube adapted for packaging of fluid, powdery or granular goods, from strip stock by bringing longitudinal margins of the stock into overlapped adhesively bonded relation and applying an extruded thermoplastic coating to the longitudinally seamed cylinder so formed.

Another more specific object of the invention is to provide an improved apparatus for bonding the overlapped longitudinal margins of strip stock being formed into a continuous interiorly coated and sealed tubular structure adapted for use in packaging powdery, fluid or granular goods.

Other objects and advantages of the invention will appear from the following description and the drawings, wherein:

FIG. 1 is an external view of the pertinent portions of an extrusion head with strip stock being brought into a cylindrical form on the head, but with certain other elements of the apparatus omitted for clarity;

FIG. 2 is a longitudinal section through the extrusion head taken as indicated by line II—II in FIG. 1;

FIG. 3 is a cross section through the strip stock being formed into a cylinder, showing the shape attained at the region of the extrusion head indicated by the line III—III in FIG. 2;

FIGS. 4, 5, 6, 7, and 8 are cross sections taken substantially as indicated in FIG. 2 by the lines IV—IV to VIII—VIII respectively; and FIG. 9 shows one form of completed package which may be produced by the method and apparatus of the present invention.

One form of apparatus whereby the improved method may be carried out, and embodying apparatus improvements in accordance with the invention is shown in the drawings. In the disclosed apparatus, the extrusion head body 1 has a central bore enlarged in a funnel-like or counter-bored manner at the low free end of the body; and the nozzle tube 5 and its shallow conical end enlargement 4, in conjunction with the surrounding parts of the body within which they are coaxially disposed, respectively define the extrusion material feed channel or passage 2 of annular cross section and the annular extrusion ring nozzle 3. A filling tube 6 for carrying material to be packaged through the extrusion head into packaging formed thereon is coaxially disposed in the larger axial bore through the nozzle tube 5 and its enlargement 4, again defining again a channel or passageway 7 of annular cross section for introduction of an inert gas to the interior space defined below the extrusion head by the end of the head and the container or packaging being produced thereon. As shown in FIG. 6, an enlarged portion of the nozzle tube 5 having axially directed openings therethrough for passage of the extrusion material, thereby leaving in effect radial spacing lugs on the main portion of tube 5, contacting the inner bore of the extrusion head body, provides a centering ring structure or means for maintaining the nozzle tube 5 and its enlargement 4 in proper coaxial relation relative to the extrusion head body.

Suitably spaced upwardly above the ring nozzle 3, the extrusion head is provided with a radially projecting auxiliary nozzle structure 8 for bleeding off a portion of the extrusion material as a seam cement. The amount of material leaving this auxiliary nozzle 8 is regulated as required through an adjusting screw 9 threaded through the auxiliary nozzle wall to vary area of the feed passage leading to the endwise nozzle opening. A strip stock of paper, pasteboard, synthetic plastic sheeting, or other suitable material continually fed from a supply roll over directing guide rollers (see FIG. 1) is curled or bowed around the extrusion head to achieve a continuously produced tubular form as hereinafter described, the longitudinal margins of the strip being brought into an ultimate overlapped and cemented relation in a longitudinal seam. As may be seen in FIGS. 2 and 4, a finger 11 of spring metal is mounted or fixed on some environmental structure external to the extrusion head itself, here on a carrier 12. As a pressure member bearing on the outside of the strip, a foot or end pad formation on the spring 11 presses the inner side of one longitudinal margin of the strip against the radially opening mouth of the auxiliary nozzle 8 whereby a thin stripe or band of the thermoplastic mass is applied or wiped onto the stock at a well-defined location. The carrier 12 is fixed through it may be adjustable relative to the extrusion head in some suitable manner, for example being mounted on a fixed portion of the frame of the extrusion machine. The carrier 12 also mounts rotatably an outside fixed pressure roll 13 with axis disposed transversely to, and having a longitudinally concave curvature complementary to the convex exterior of, the tube against which it presses. In a recess 14 of the extrusion head body another pressure roll, here barrel shaped to conform to the concave internal curvature of the tubing form is mounted on an outwardly spring biased lever 16 in parallel relation to, and for cooperation with, the opposed outside roll in applying pressure to the longitudinal seam area of the tubing structure passing therebetween.

A ring guide element 17 surrounding the extrusion head body is disposed in a vertical location between the auxiliary nozzle and the pressure roll set and serves to bring the longitudinal margins or edges of the strip together into a tubular body and also to bring the edges into overlapped relation. The internal periphery of this ring is however so shaped, as by a generally radial offset or stepped discontinuity of its curvature at the location of the overlapping (see FIG. 5), that the coated and uncoated margins of the strip, although already in overlapped relation, are still held apart so that they do not prematurely come into contact, that is, before entrance between the pressure roll set 13, 15.

For preheating of the paper strip 10 passing over the extrusion head, the head body 1 is provided with an electrical heater 18 generally surrounding the same, which in turn is covered by a metal guard sheath or jacket 19. Also in the region between the auxiliary nozzle 8 and the strip forming or guide ring 17 there is provided a circumferential jacket-like electric radiation heater 20, surrounding the now substantially cylindrically formed paper tube. The function of this heater is first to bring the paper stock up to the temperature required for a subsequent coating of its interior side with a thermoplastic synthetic plastic tubing; and further to raise the temperature of the adhesive stripe of the thermoplastic material already applied by the nozzle 8 to the longitudinal margin of the paper strip so that a permanent bonding in a longitudinal seam is subsequently obtained upon passage between the pressure roll set 13, 15.

In operation, the initially flat smooth paper strip is drawn off a supply roll and carried over the extrusion head, being gradually bent or formed at the extrusion head into the general form of an open cylinder, as shown at FIG. 3. This bowing or bending of the paper strip together results by the action of the guide ring 17. The progress of the formation of the sheet may be observed from FIGS. 3 to 8 inclusive. At first the edges or margins of the bowed or curled paper strip are relatively far from one another (see FIG. 3), and are still separated (see FIG. 4) when one margin passes over the lateral or auxiliary nozzle where it is coated with the adhesive. At the location of the section V—V, that is at the location of the guide ring element 17, the two margins of the paper strip are already in overlapped relation, but are held separated through the internal peripheral form of the guide ring. At the level of section VI—VI, therefore of the pressure rolls, the strip edges are pressed together and a bonding into a seam is achieved, whereby a closed tubular form body (see FIG. 7) arises.

Immediately after the closing of the seam, the paper tube reaches the region of the main extrusion nozzle or ring nozzle 3 from which a synthetic plastic tube is issuing in contact with the interior surface of the seamed paper tubing. Under the pressure of the inert gas introduced through the channel 7, the thermoplastically extruded tube is firmly applied on and hence coats the inner wall of the tubing with a tight or closed synthetic plastic coating or layer. It may be here noted that the internal pressurization advantageously obviates the need in this region of a mandrel-like axial extension on the nozzle-defining enlargement 4 and a cooperating die-like ring or collar circumferentially disposed thereabout externally of the paper tubing, as used in prior practice.

At a further point at the progress of the continuous advancement of the now formed strip 10, fluid or pourable material to be packaged may be continually introduced into the interiorly coated tubing; and after a desired fill is attained, the packaging may be pinched off in a transverse direction at one location, and then again in a direction at right angles to the first in a manner well known to the prior art. The product of this manner of operation is a separate sealed container of generally tetrahedral form as shown in FIG. 9. The pinching operation may be achieved by sets of clamping jaws below the extrusion head (see FIGS. 1 and 2) effective to weld or adhere the coated tubing to itself.

Although at times this invention has been described in terms of paper strip as the stock from which the cylinder or tubing is formed, it is to be understood that other apt materials may be used, such as the previously named pasteboard, cardboard or synthetic sheeting in continuous strip form.

We claim:

1. In an apparatus for the continuous production of an interiorly sealed tubing comprised of paper or other like strip stock, such as is adapted for fabrication into packaging for fluent materials wherein an extrusion head continuously extrudes a tube of thermoplastic material through a ring nozzle, an advancing strip of said stock is transversely bowed around the extrusion head into a hollow body axially advanced into surrounding adherent laminated relation to the extruded tube, and edges of the strip are brought into overlapped relation and bonded into a longitudinal seam by a separately expelled portion of the said material, that improvement comprising the provision of means for maintaining a gaseous pressure in the interior space of the laminated tubing as it is being formed, and a laterally directed auxiliary nozzle structure on said head and communicating with a plastic feed channel leading to the ring nozzle and having a radially opening nozzle mouth, and elastic means for holding one margin of the advancing strip to the said mouth for applying a stripe of the thermoplastic material thereto as a seam adhesive.

2. Apparatus as set forth in claim 1, wherein said elastic means comprises an adjustable spring-urged foot disposed opposite the auxiliary nozzle for pressing the said margin against the auxiliary nozzle mouth.

3. Apparatus as set forth in claim 1, including adjustable spring biased means for pressing the margins of the strip together after application of the adhesive stripe.

4. In an apparatus for the continuous production of an interiorly sealed tubing from paper or other like strip stock, such as is adapted for fabrication into packaging for fluent substances wherein an extrusion head continuously extrudes a tube of thermoplastic stock, an advancing strip of said material is transversely bowed around the extrusion head into a cylindrical hollow body axially advanced into surrounding adherent laminated relation to the extruded tube, and edges of the strip are brought into overlapped relation and bonded into a longitudinal seam by a separately expelled portion of the said material: an extrusion head structure comprising a body having a substantially axially located center bore and a counterbored end, a nozzle tube coaxially disposed in and spaced from the center-bore and terminating in a shallow conically formed end enlargement within the counter-bore to define respectively with the body an extrusion feed channel and ring nozzle, said end enlargement terminating substantially flush with the outer periphery of the counter bore; a central passage through said nozzle tube as means for introducing a gas into the interior free space defined between the end of the head and the laminated tubing whereby a pressure is continually maintained within the laminated tubing as it is being formed; and at a location spaced lengthwise from the ring nozzle, a laterally extending auxiliary nozzle communicating with said feed channel for applying a stripe of the thermoplastic material to a longitudinal margin of a strip advanced thereover 5. Apparatus as described in claim 4, including centering means for keeping the nozzle tube in properly spaced location relative to the head body, said centering means being provided with axially directed apertures for passage of the extrusion mass therethrough.

6. Apparatus as set forth in claim 4 including: a guide ring circumferentially disposed about the extrusion head structure for bringing the edges of the strip into overlapped relation at a locus between the ring nozzle and auxiliary nozzle.

7. Apparatus as set forth in claim 6 wherein the inner peripheral surface of the guide ring is provided with an offset for keeping the adhesively striped margin and other margin out of contact until in completely overlapped relation.

8. Apparatus as set forth in claim 4, including, in the region between the auxiliary nozzle and the ring nozzle, a circumferentially disposed radiant electric heater for heating cylindrically formed stock from the exterior.

9. Apparatus as set forth in claim 4 including, between said auxiliary nozzle and said ring nozzle, a parallel roller set comprising an inner and outer roller for pressing the margins of the strip into permanently seamed relation.

10. Apparatus as set forth in claim 9 wherein the inner roller is carried on a spring biased mounting in a recess in the extrusion head body.

11. Apparatus as set forth in claim 10, including a spring pressured member for directing across the auxiliary nozzle the strip margin to be striped thereby; and, mounted on the extrusion machine with which the head is used, a holder for supporting said spring pressured member and the outer roller of said set.

References Cited in the file of this patent

UNITED STATES PATENTS

| 1,712,454 | Spencer | May 7, 1929 |
| 2,105,273 | Smith | Jan. 11, 1938 |
| 2,125,025 | Huckfeldt et al. | July 26, 1938 |
| 2,132,239 | Harrison | Oct. 4, 1938 |
| 2,958,364 | Thompson | Nov. 1, 1960 |